United States Patent [19]

Walker

[11] Patent Number: 5,399,048

[45] Date of Patent: Mar. 21, 1995

[54] METHOD OF CAPPING EXPOSED LAND AREAS AND PARTICULATE MATERIALS DEPOSITED THEREON

[75] Inventor: Daniel D. Walker Jr., Henderson, Nev.

[73] Assignee: Chemical Lime Company, Fort Worth, Tex.

[21] Appl. No.: 71,698

[22] Filed: Jun. 4, 1993

[51] Int. Cl.$^6$ .......................... B09B 3/00; E02D 3/00
[52] U.S. Cl. .................................. 405/129; 405/128; 405/258; 405/264
[58] Field of Search ............... 405/128, 129, 258, 263, 405/264; 588/252

[56] References Cited

U.S. PATENT DOCUMENTS

| | | |
|---|---|---|
| 3,634,302 | 1/1972 | Harnsberger . |
| 3,644,266 | 2/1972 | Harnsberger . |
| 3,720,640 | 3/1973 | Harnsberger . |
| 3,854,968 | 12/1974 | Minnick et al. . |
| 4,456,400 | 6/1984 | Heide et al. . |
| 4,669,919 | 6/1987 | Hilterhaus et al. . |
| 4,836,945 | 6/1989 | Kestner . |
| 5,054,962 | 10/1991 | Bahnmuller et al. . |
| 5,118,219 | 6/1992 | Walker, Jr. . |
| 5,128,390 | 7/1992 | Murphey et al. . |
| 5,141,362 | 8/1992 | Kugler . |
| 5,161,915 | 11/1972 | Hansen ................................ 405/129 |
| 5,259,698 | 11/1993 | Garzon ................................ 405/129 |

*Primary Examiner*—David H. Corbin
*Attorney, Agent, or Firm*—Jr. Charles D. Gunter; Susan L. Firestone

[57] ABSTRACT

A method and formulation are shown for capping the exposed surface of an aggregate of materials, such as exposed land areas with fine particulate mining wastes. A mineral formulation is prepared by mixing together lime, a pozzolanic component, a sulfate component, a cellulosic component and water. The mineral formulation is applied to the exposed aggregate and is allowed to harden to form a surface coating thereon. A seed component or a coloring additive can be incorporated within the slurry for revegetating land areas and to enhance the esthetic appearance of the hardened cap.

17 Claims, No Drawings

METHOD OF CAPPING EXPOSED LAND AREAS AND PARTICULATE MATERIALS DEPOSITED THEREON

BACKGROUND OF THE INVENTION

1. Field of the Invention

The present invention relates generally to a method of capping the exposed surface of a mass of particulate materials that tend to become airborne or unconsolidated due to environmental factors such as wind and rain.

2. Description of the Prior Art

There are a variety of circumstances in which environmental and economic concerns require enclosing the exposed surfaces of a mass of particulate materials. These surfaces include stockpiles of dust producing bulk materials as well as bare and unconsolidated land masses. Capping readily forms a barrier that encloses these exposed surfaces to prevent their loss due to environmental factors.

For instance, capping mining and industrial tailings ponds would reduce dusting and pollution caused by the ponds. In areas with previous or present mining operations, thousands of acres of tailings ponds are subjected to high winds which cause "dusting" and the creation of intolerable dust storms. These ponds are made from finely ground waste ore that was previously incorporated into a liquid slurry, pumped to a dammed land area and allowed to settle and dry. In the case of active mining operations, aqueous fines-containing effluent is pumped to the tailings pond, where the water collects and clears. The cleared water is then pumped back to the mining operation. Part of these large pond areas are allowed to dry up, so that tailings remain at a constant level. Winds easily blow the dried up fines, thus "dusting" the communities downwind.

Due to increasing population pressures, many of these sites lie near inhabited areas. Especially in the Western United States, expanding environmental regulations and political pressure make it imperative that an economical solution to the tailings ponds problem is found to prevent dusting and reduce airborne pollution. Capping these areas would be beneficial.

Other industrial processing sites would benefit from capping. For example, ponds with fines-containing aqueous effluent, sludges and slimes, such as those from the phosphate industry, tar sands industry or bauxite industry, continue to pollute the environment despite efforts to control the pollution. The borax industry, another example, has high levels of arsenic in its waste dumps. Capping these waste dumps would prevent dusting, and thus contain the arsenic within the dump. Manufacturing and power generating industries, such as power plants, sugar mills and the like, generate storage piles which can also benefit from capping. These industries stockpile large amounts of fine particulate waste or process materials at any given location. Capping these open stockpiles can prevent dusting and erosion.

The above-mentioned industries are not the only industries where capping would be beneficial. Sanitary landfills frequently leave exposed areas of debris as operators move around the landfill site. Capping such areas would prevent blowing debris as well as allow daily cell closure for odor and vector control. In many areas, hazardous landfills are presently required to be routinely capped. Since many of these hazardous materials are acidic, capping to prevent blowing dust as well as stabilize pH improves the efficiency of hazardous landfill operations.

Capping would be useful in the construction industry. Construction sites frequently store large piles of dirt and top soil during construction. Wind often causes excessive dusting and loss of topsoil. Depending on the site and location, the berms of many roadsides or ditches are frequently built with loose material that generates dust through the swirling effect of moving vehicles passing by them on the road. Such exposed areas can be advantageously treated by capping.

The capping material can help revegetate bare exposed areas, such as reforesting after forest fires, seeding grass after construction, and the like. The capping material could serve as an overlay over seeded land or modified to include grass or tree seeds within the material. The capping material would provide a convenient medium for the reseeding of the affected area while protecting the top soil, thus providing both erosion control and revegetation.

A significant amount of bulk materials, such as coal, fly ash, ore and the like, are stored and/or transported in open containers, such as rail cars or trucks. Open rail coal cars travelling from the Western to Eastern United States frequently lose between 2% to 5% by weight of their load through dust emissions. Such dust emissions increase with wind erosion and the vibration of the rail car during transit. Capping would reduce this loss.

Prior to capping, additives were generally applied to an exposed surface of the bulk material in the form of a liquid spray or foam. U.S. Pat. No. 4,836,945, issued Jun. 6, 1989, to Kestner contains a detailed discussion of various prior art chemical controls including the use of water and oil sprays. Included among the prior art materials are aqueous solutions of vinyl esters, latex emulsions, asphalts, waxes and various other polymers. These prior art formulations tend to be expensive and, in some cases, use environmentally objectionable components.

U.S. Pat. No. 5,118,219, entitled "Method of Capping Tailings Ponds", issued Jun. 2, 1992, to Daniel D. Walker, Jr. teaches a method for capping tailings ponds. A mineral formulation is prepared by mixing together lime, a pozzolanic component, a sulfur component and water. The mineral formulation is applied to the surface of the fines-containing tailings pond and is allowed to harden to form a surface coating on the tailings pond. A thin, semi-permeable cap forms that resists weathering.

However, field tests of the above-mentioned method showed room for improvement. Capping tailings ponds with the '219 formulation was ineffective in areas exposed to constant winds. The capping materials blew away within a few days under constant winds.

The present invention is an improvement upon the previous '219 formulation, providing a method especially well adapted for capping exposed areas and preventing fine particles and debris from blowing in the wind. The present invention provides an environmentally acceptable, semi-permeable, cementiceous, non-hazardous, membrane to cap exposed land areas, including areas with deposited particulate materials.

Another object of the invention is to provide a mineral formulation for capping land areas that serves as a suitable matrix for carrying and depositing plant and vegetable seeds during reseeding and revegetation operations.

Another object of the invention is to provide a semi-permanent cap for surface land areas that is semi-permeable and allows water to pass through without breaking the integrity of the surface.

Another object of the invention is to provide a capping formulation for land areas which can be colored to match its surroundings.

SUMMARY OF THE INVENTION

A method is shown for capping an aggregate of materials, including fine particulate materials deposited on exposed land areas. A slurry is prepared by mixing together lime, a pozzolanic component, a sulfate component, a cellulosic component and water. The relative proportion of the ingredients used to formulate the slurry are selected to provide a product that, when hardened, possesses certain requisite compressive strength, erosion resistance and esthetically pleasing characteristics. The slurry is applied to the exposed surface to be capped and is allowed to harden to a solid mass that substantially covers the exposed surface to be capped. In applications requiring revegetating land areas, a seed component can be incorporated in the formulation. Preferably, the liquid slurry is prepared by mixing together lime, fly ash, a sulfate component, a cellulosic component with medium to long fibers and water.

Preferably, a slurry is prepared by blending together a dry mineral formulation comprising from about 15 to 25 weight percent lime or its equivalent, from about 45 to 75 weight percent fly ash, from about 4 to about 12 weight percent sulfate, from about 1 to 2 weight percent shredded medium to long fiber paper material and at least about 0.1 weight percent triethanolamine, all weight percents based on the total dry weight of the mineral formulation. The mineral formulation is then mixed with water in a preferred ratio of about 1 to 3 to form a slurry. The slurry is applied to the exposed surface to be capped and allowed to harden. The hardened formulation has a measured unconfined compressive strength that is greater than about 500 psi, and preferably greater than about 1000 psi.

Additional objects, features and advantages will be apparent in the written description which follows.

DETAILED DESCRIPTION OF THE INVENTION

In the method of the invention, a formulated material is prepared which forms a coating or capping material that can be easily applied to an exposed surface, such as exposed land. The formulated material is a slurry of water and a dry mineral formulation which is formed by mixing together lime, a pozzolanic component, a sulfate component and a cellulosic component. In the case of land surface applications, a coloring additive and/or a seed component can be included for esthetic purposes and to revegetate land areas.

The lime component of the formulation is any reactive calcareous component containing calcium and/or magnesium oxide or hydroxide or other form of chemically combined calcium or magnesium which, under the conditions employed in the steps of the method, react with the other siliceous, aluminous and sulfurous components of the formulations to form calcium, aluminum, sulfur or silica hydrates, such as ettringite and tobomorite crystals. Preferably, the reactive calcareous component is high calcium quicklime or hydrated lime. High calcium quicklime, CaO, useful in the present invention has a CaO content of greater than about 90% by weight, preferably greater than about 95% by weight. The reactive calcareous component is preferably present in the dry formulation in the range from about 15 to 25% by weight for quicklime based on the weight of the total dry formulation, with an equivalent amount for hydrated lime or other calcareous sources. When quicklime is used, the capping layer forms a hydrated lime precipitate. Using hydrated lime reduces the turn-around time and produces no precipitate as compared to using quicklime, although the formulation material is less dense than the quicklime material. Hydrated lime is most preferred.

The pozzolanic component of the mineral formulation is a reactive siliceous aluminous component which is employed in the range from about 45 to 75% by weight of the total dry formulation. Such reactive siliceousaluminous components include artificial or natural pozzolans, pulverized fuel ash (fly ash), granulated slag, pumice dust, ground silica, clay such as bentonite or kalonite, Portland cement kiln dust, lime kiln dust and others, as well as mixtures thereof having a pozzolanic character. In this disclosure "pozzolan" refers to a finely divided material rich in silica or alumina which, while not necessarily cementiceous by itself, will react at ordinary temperatures with hydrated lime in the presence of water to form a cementiceous product. The preferred siliceous/aluminous component is fly ash. Fly ash is a commercially available product that will be familiar to those skilled in the art. It is obtained, for example, as a by-product of coal combustion. Fly ashes having a high quartz or silica content and a low gypsum content, such as Navaho and Mojave, are particularly preferred.

Pozzolanic components should be tested for unconfined compressive strength in the formulation prior to using them for capping. While testing various commercial sources of fly ashes, one particular source produced a heavy efflorescence of calcium sulfate. This particular fly ash formulation also had low compressive strength with the testing described below. Analysis of this particular fly ash indicated that it contained significant amounts of gypsum. Therefore, the formula of the invention should be adjusted to compensate for the excess sulfate in the pozzolanic component.

The '219 formulation next preferably used gypsum or sulfuric acid to react with the lime/fly ash. Gypsum and sulfuric acid presented a number of problems. It was hard to find an economical source of gypsum that did not contain some large rocks or was completely dry. The rocks plugged the application nozzle and pumps, while the moisture reacted with the quicklime to form lumps. Gypsum is only slightly water soluble. Gypsum, therefore, does not dissolve completely in the slurry and tends to settle out rapidly, leaving residue in the mixing container. Sulfuric acid, a dangerous corrosive liquid, made the material difficult to formulate as a dry mixture.

Therefore, the sulfur component of the improved formulation is a sulfate containing material that can react with the lime/fly ash to develop ettringite and possibly tobomorite crystals in the mineral formulation. Sulfates that are dry, contain no large rocks and are very soluble in water should be used. Many of these sulfates are used in the fertilizer and food industries and are nontoxic. Examples of these sulfates are sodium sulfate, potassium sulfate, magnesium sulfate, manganese sulfate, ammonium sulfate, aluminum sulfate, lithium sulfate, and the like. Sodium sulfate is especially preferred. Although the cost of sodium sulfate is greater than gypsum, the chemical reaction of sodium sulfate with the rest of the formulation is more complete, so less can be used, therefore reducing the expense. The effective amount of sodium sulfate ranges from about 4% to about 12% based on the total weight of the dry formula, although about 8% is optimum. Obviously, if a different sulfate salt is used, the equivalent amount should be used. However, when capping with high levels of sulfate, a white efflorescence develops on the surface. Therefore, using between about 4% to about 8% sodium sulfate or its equivalent is preferred.

If significant levels of sulfates are present in the pozzolanic component, the amount of sulfate added to the formulation should be adjusted. For instance, when 13.5% sodium sulfate is added to the formulation, the unconfined compressive strength decreases. Formulations with fly ashes containig high levels of calcium sulfate also have decreased unconfined compressive strengths. From these results, it appears that high levels of sulfates interfere with the unconfined compressive strength of the capping formulation, and consequently should be avoided by adjusting the final amount of sulfate in the formulation or using pozzolanic components with low levels of sulfate.

The mineral formulation also contains a cellulosic component to increase the tensile strength of the capping material. The cellulosic component breaks into individual cellulosic fibers when mixed in the formulation slurry. These fibers interlock and form a matted layer. Surpisingly, the type of cellulosic fiber makes a difference for the improved formulation. The preferred cellulosic fiber size is about 3 mm to about 10 mm in length. Excellent sources of cellulosic fibers of this length are shredded paper from a hammer mill, with ground newprint having medium to long fibers preferred. The cellulosic component is present in the range from about 1% to 2% by weight, based on the total weight of the dry formulation.

Preferably an amine, such as triethanolamine (TEA) or teacup, is added to the formulation. TEA improves both the tensile and compressive strength of the formulation. Since TEA is a liquid, it should be used sparingly in the mineral formulation of the invention. The more TEA used, the stronger the formulation. No upper limit of TEA has been established and no specific amount of TEA is currently preferred. Due to its cost, however, TEA is regularly used at about 0.1% to about 0.6% by weight, with 0.5% typically employed. Diethanolamine and ethanolamine can be used as well, preferably as a mixture with TEA.

If desired, glue, such as a polymer or an adhesive, may be used in the formulation. Glue increases the capping formulation's tensile strength. Although no particular type or amount is preferred, preliminary tests with 0.25% to 0.75% by weight glue, indicate that greater amounts of glue yield greater tensile strengths. Sodium silicate, sodium gluconate or starch are examples.

In certain applications, the mineral formulation may contain additional ingredients such as coloring additives and plant seeds. If coloring additives are used, the amount of additive should be sufficient to produce the selected color. Clearly, both the type and amount of additive vary with the color and its intensity and depend on the final application of the capping material.

In the case of reforesting operations, the mineral formulation of the invention could serve as a useful matrix to anchor plant seeds during the initial stages of growth. Many of the sulfates that can be used in the formulation are commonly used as fertilizers, and accordingly provide a ready source of nutrients for seedlings. The capping material can be directly laid over a seeded surface, or if desired, a seed component ranging from about 0.1% to about 5% by dry weight of the formulation can be added to the capping material. If quicklime is used, heat intolerant seeds should be added after forming the slurry and the slurry's temperature diminishes.

The remainder of the formulation uses sufficient water to form a slurry. Water can be obtained from any convenient source and is mixed with the mineral formulation on about a 4:1 to about a 2:1 ratio. Water is most preferably mixed with the mineral formulation on about a 3:1 ratio. Unexpectedly, introducing the formulation solids to the total water, rather than adding water to the formulation in increments, reduces the amount of white precipitate (calcium hydroxide) formed with the quicklime formulations. Adding water in this manner also decreases the heat with the quicklime formulations and has a negligible effect on the strength of the capping formulation. Therefore, adding the formulation solids to the total water is both convenient and preferred. When quicklime is used, the quicklime must be completely hydrated in the slurry prior to capping.

In practicing the method of the invention, a slurry forms by mixing the mineral formulation with water. The slurry is sprayed or spread over the surface to be treated. The slurry can be sprayed in any economical manner that produces an even layer. For ground applications, the slurry is preferably sprayed over the surface in a double thickness layer (about 1 to about 2 mm) sprayed in one pass with commercially available, hydromulching type equipment.

In the case of capping bulk materials in open containers for transit, the capping layer is preferably about 1 to 3 mm thick and can be brushed on, sprayed on with a hydromulcher or a spray bar with nozzles mounted over an open storage container such as a transit car. Once the cap hardens, the bulk material can be transported without significant dust emissions.

Because of the effect of human and vehicular traffic, as well as the effect of natural environmental factors such as wind and rain, the capping formulation must meet certain unique requirements of compressive strength, tensile strength and erosion resistance. These tests are described as follows.

In order to evaluate the toughness of the capping formulation of the invention, the unconfined compressive strength and tensile strength of the materials are measured. Compressive strength is measured after making a paste of different mineral formulations in the following manner. A dry, well mixed blend of formulation ingredients is added to water to form a thick paste. When quicklime is used, the quicklime/water reaction is not allowed to go to dryness. The paste is aged for 60 minutes with occasional stirring. The pastes are then blended to a vicat penetration of 15±5 mm (according to ASTM standard consistency test method C 110). Cubes are made in a 2 in. mold of each formulation, sealed in plastic, then cured for 24±1 hr. in an oven at 120° F. The cubes are removed from the mold and plastic, then air dried overnight before determining compressive strengths.

The capping formulation's tensile strength is measured by making a slurry with 3 parts by weight water to 1 part by weight dry mineral formulation. A thickness mold of about 2 mm deep, 2 in. wide and 12 in. long is used for making strips. The mold is filled with the slurry, allowed to drain for 60 min., then sealed in plastic and cured at 120° F. for 24±1 hr. After curing, the strips are removed from the plastic and mold, then air dried overnight. The tensile strength measurement is made by suspending a strip with capping material between two supports exactly 2 inches apart. A vessel is placed on top of the strip and small lead shot is added to the vessel until the strip cracks. The combined weight of the vessel and the lead shot is used to calculate the tensile strength of the capping material. The results are verified by comparison to a standard of known tensile strength.

For reliable testing, curing the cubes and strips is important. Curing times for testing must remain fixed for an accurate comparison between compressive strength and tensile strength, as well as for equivalent atmospheric aging. In soil work, curing in an oven at 120° F. for 48 hours is equivalent to about six months aging at 70° F. Curing for 24 hr. should be equivalent to about three months of atmospheric aging. Consequently, testing unconfined compression strength and tensile strength as described above measures the compressive and tensile strength of the formula after three months.

Due to the wind failure of previous formulations in the field, the capping formulation is also tested under high wind loadings. For this purpose, a wind tunnel has been built with 55 gallon barrels laid horizontally with a blower at one end to generate wind speeds of up to about 35 mph. Water sprays simulate rain, while a heat source fastened above the test material simulates heat from the sun.

The formulation material is tested in the wind tunnel for five days using the following protocol. First, a sample load of bulk fines is placed into a test tray. A thin layer of the capping formulation is applied over the bulk fines in the test tray and cured overnight in the wind tunnel without wind or rain and at ambient temperatures. The next day, heat (120° F.) and a light wind (10 mph) are first applied to the test tray for 3 hr., then moderate winds (20 mph) for an additional 4 hr. During day three, light rain is simulated for 3 hr., with moderate wind applied for the rest of the day. On days four and five, rain is simulated for 2 hr., while strong winds (35 mph) blow for the rest of the day or until failure.

The preferred formulations of the invention, when cured, have a compressive strength greater than about 500 psi and are most preferably greater than about 1000 psi. Although not perfect, a positive correlation exists between the tensile strength and the unconfined compressive strength, indicating that the cube strength is a valid method to evaluate the strength of the formulation. The preferred formulations should also perform well in the wind tunnel testing, with the capping material remaining intact for the full five days of testing.

EXAMPLE 1

The formulations in Table 1 were tested for unconfined compressive strength (UCS) and tensile strength (TS) using the methods discussed above. In the experiment, either quicklime (QL) or an equivalent amount of hydrated lime (HL) was used under optimum conditions. Flyashes from three different sources were tested. For compressive strength, at least six different cubes were tested for each formulation.

TABLE 1

| | Test Number | | | |
|---|---|---|---|---|
| | 1 | 2 | 3 | 4 |
| Lime % | 23 QL | 23 QL | 29 HL | 29 HL |
| Fly Ash % | 70.7 M | 72.7 S | 62.7 M | 64.7 N |
| Sodium Sulfate % | 4 | 2 | 6 | 4 |
| Paper (long fiber) % | 2 | 2 | 2 | 2 |
| Teacup % | 0.3 | 0.3 | 0.3 | 0.3 |
| VICAT (mm) | 12 | 10 | 18 | 10 |
| Water (ml) | 610 | 640 | 500 | 450 |
| UCS (psi) ± S.D. | 1017 ± 43 | 455 ± 32 | 938 ± 92 | 846 ± 44 |
| TS (g) | 963 | 734 | 1582 | 875 |

The compressive strengths of the M and N flyashes were virtually indistinguishable from each other, while the S fly ash compressive strength was significantly reduced from the M and N fly ashes. The S fly ash had high levels of gypsum present, while the M and N fly ashes had low levels of gypsum.

EXAMPLE 2

The formulations in Table 2 were tested for their unconfined compressive strength and tensile strength as described above. All formulations had 23% quicklime, 67% fly ash, 8% sodium sulfate and 2% long fiber paper, all based on the dry weight of the formulation. Additional components to the formulation were tested as described in Table 2. The glue used in Run No. 11 was sodium silicate. All the other tests used sodium gluconate for the glue.

TABLE 2

| | Test Number | | | | | | |
|---|---|---|---|---|---|---|---|
| | 5 | 6 | 7 | 8 | 9 | 10 | 11 |
| Glue % | — | 0.5 | 0.5 | — | 0.75 | 0.25 | 0.25 |
| Teacup % | — | 0.25 | — | 0.3 | 0.3 | 0.1 | 0.75 |
| VICAT (mm) | 12 | 11 | 15 | 8 | 12 | 10 | 15 |
| Water (ml) | 700 | 585 | 710 | 580 | 590 | 535 | 623 |
| UCS (psi) | 227 ± 8 | 973 ± 126 | 618 ± 39 | 1055 ± 132 | 1063 ± 92 | 997 ± 76 | 1231 ± 116 |
| TS (g) | 110 | 704 | 275 | 757 | 704 | 642 | 595 |

EXAMPLE 3

In field tests, 1600 pounds of capping formulations disclosed in Table 3 were made up and packaged in sling bags for transport to the field site. At the site, the formulation material was mixed directly in a hydromulcher and sprayed onto the test area. The testing site was a tailings pond exposed to constant wind. The site was in at a location where the '219 formulation failed. While spraying, the wind blew constantly at 5 mph with gusts over 20 mph.

TABLE 3

| | Test Number | | | | |
|---|---|---|---|---|---|
| | 1 | 2 | 3 | 4 | 5 |
| Lime % | 23.0 | 29.0 | 29.0 | 23.0 | 29.0 |
| Fly Ash % | 70.7 | 62.7 | 63.7 | 66.0 | 60.0 |
| Sodium Sulfate % | 4.0 | 6.0 | 5.0 | 8.0 | 8.0 |
| Paper (long | 2.0 | 2.0 | 2.0 | 2.0 | 2.0 |

TABLE 3-continued

| | Test Number | | | | |
|---|---|---|---|---|---|
| | 1 | 2 | 3 | 4 | 5 |
| fiber) % | | | | | |
| Teacup % | 0.3 | 0.3 | 0.3 | 0.3 | 0.3 |
| Glue (Sodium Gluconate) % | 0.0 | 0.0 | 0.0 | 0.75 | 0.75 |
| UCS (psi) ± S.D. | 1017 ± 43 | 938 ± 92 | — | 1063 ± 92 | — |

The test sites were evaluated six days after capping. The wind had blown constantly since capping. If possible, samples of the cap were removed for evaluation of cap thickness and attachment of fines.

Site 1 had good coverage with the capping material, although it was thinner in some spots. In the thick spots, 1 to 3.5 in. samples were removed for evaluation. The cap was 0.5 to 2.5 mm thick. Fines were well attached and were removed by scraping with a knife and brush.

Site 2 had good coverage with the capping material, although thinner in some spots. There was no indication that any of the cap had failed or blown away. 0.25 to 0.75 in. samples of the cap were evaluated. About a 0.125 in. layer of tailings fines were attached to the cap sample. Fines were carefully removed with a knife and brush as the cap was fragile.

The coverage in Site 3 was excellent. The cap had good strength and held together well. The cap had no raveled spots, even in thinner areas. The cap sample was about 1 mm thick and fragile. Fines attached at about a 1 mm to about 2 mm thick layer.

At site 4, the cap was the only test cap that bubbled. The bubbling was similar to the bubbling seen with earlier failures of the '219 formulation cap. Since this was a quicklime formula, the bubbling may have resulted from quicklime hydration. If the quicklime was not completely hydrated, hydration could continue and expand the capping material to cause the bubbling. Cap samples were 0.25 to 1.5 in. and 0.5 to 1 mm thick. The fines layer ranged from about 0.125 to 0.2 in. and was difficult to remove, even with a knife. This patch was expected to fail.

The fifth site had the best coverage, with the cap holding very well. Samples of the cap ranged from 0.25 to 1.5 in. and were about 1 mm thick. The fine layer was about 0.125 to about 0.2 in. thick and was removed with a knife and brush.

Based on the above results, an especially preferred capping formulation is shown below in Table 4.

TABLE 4

| Hydrated Lime | 29% |
|---|---|
| Sodium Sulfate | 8% |
| Fly Ash (low gypsum) | 60% |
| Paper Fiber (long fiber from newsprint) | 2% |
| Teacup | 0.3% |
| Water to Mineral Formulation | 3:1 |
| Compressive Strength | >800 psi |

The invention provides several advantages. The capping formulation of the invention can cap land and other surface areas where blowing dust can create environmental or esthetic problems. The formulation of the invention provides a semi-permanent permeable cap which allows water to pass through without breaking the integrity of the surface. Depending upon weather conditions, traffic and other site activities, the cap's expected life is at least three months, and most likely greater than one year. In the case of land surface applications, the formulation can be colored to match the surroundings or incorporate seeds within it, thus making it useful in environmental applications. Uses include tailings ponds, construction sites, restorative stabilization of unpaved parking areas, road berms and embankments, ash piles, fine grained agricultural waste piles and open transport cars. The formulation is more cost effective and durable than other currently available dust control techniques. Because of the crystal nature of the capping material of the invention, water does not collect and puddle but quickly percolates through the surface of the cap. The cap, as a result, does not wash away due to normal water flow. The formulation and method of the invention are economical in practice in that low cost, waste materials are primarily utilized in the formulation. The formulation consists of mineral type materials that are safe and nontoxic and do not degrade to environmentally unsafe substances.

While the invention has been shown in only one of its forms, it is not thus limited but is susceptible to various changes and modifications without departing from the spirit thereof.

What is claimed is:

1. An improved method of capping an exposed surface of an aggregate of materials, the materials which tend to become airborne due to environmental factors, the method comprising the steps of:

mixing together a slurry of lime, a pozzolanic component, a sulfate component, a cellulosic component an amine component, a glue component and water and wherein the sulfate component is selected from the group consisting of sodium sulfate, potassium sulfate, magnesium sulfate, manganese sulfate, ammonium sulfate, aluminum sulfate and lithium sulfate;

applying the slurry to the exposed surface of the aggregate; and allowing the slurry to harden to a solid mass which substantially covers the exposed surface to be capped.

2. The method of claim 1, wherein the lime ranges from about 15 to about 25 weight percent.

3. The method of claim 2, wherein the pozzolanic component ranges from about 45 to about 75 weight percent.

4. The method of claim 3, wherein the sulfate component ranges from about 4 to about 12 weight percent.

5. The method of claim 1, wherein the amine component of the mineral formulation is an amine selected from the group consisting of:

triethanolamine, diethanolamine, ethanolamine or mixtures thereof.

6. The method of claim 5, wherein the mineral formulation contains about 0.1 to about 0.6 weight percent triethanolamine.

7. The method of claim 1, wherein the exposed surface of the aggregate is a land area having particulate materials.

8. The method of claim 7, wherein the land area is a seeded land area.

9. The method of claim 7, wherein the land area is a tailings pond.

10. The method of claim 1, wherein the aggregate is stored within an open storage container.

11. An improved method of capping an exposed surface of an aggregate of materials, the materials which tend to become airborne due to environmental factors, the method comprising the steps of:

first blending together a dry mineral formulation comprising lime, a pozzolanic component, a sulfate component and a cellulosic component;

thereafter preparing a liquid slurry by adding the previously blended dry mineral formulation to a total amount of water, the ratio of dry mineral formulation to total water being from about 1:2 to 1:4 by weight water;

applying the slurry to the exposed surface of the aggregate; and allowing the slurry to harden to a solid mass which substantially covers the exposed surface to be capped.

12. An improved method of capping a land area having an exposed surface of particulate materials, the particulate materials which tend to become airborne due to environmental factors, the method comprising the steps of:

mixing together a slurry of lime, a pozzolanic component, a sulfate component, a cellulosic component, an amine component, a glue component, a coloring additive and water and wherein the sulfate component is selected from the group consisting of sodium sulfate, potassium sulfate, magnesium sulfate, manganese sulfate, ammonium sulfate, aluminum sulfate and lithium sulfate;

applying the slurry to the exposed land area; and allowing the slurry to harden to a solid mass which substantially covers the exposed surface to be capped.

13. The method of claim 12, wherein the slurry is prepared by blending together a mineral formulation an amine component, coloring additive and water, the mineral formulation comprising from about 15 to 25 weight percent lime, from about 45 to 75 weight percent pozzolanic component, from about 4 to 12 weight percent sulfate component, from about 1 to 2 weight percent cellulosic component, from about 0.25 to 0.75 weight percent glue component all weight percents being based on the total dry weight of the mineral formulation.

14. An improved method of capping a land area having an exposed surface of particulate materials, the particulate materials which tend to become airborne due to environmental factors, the method comprising the steps of:

mixing together a slurry of lime, a pozzolanic component, a sulfate component, a cellulosic component an amine component, a glue component and water and wherein the sulfate component is selected from the group consisting of sodium sulfate, potassium sulfate, magnesium sulfate, manganase sulfate, ammonium sulfate, aluminum sulfate and lithium sulfate;

incorporating a seed component within the slurry;

applying the slurry to the exposed land area; and allowing the slurry to harden to a solid mass which substantially covers the exposed surface to be capped, the hardened slurry serving as a matrix to hold the seed components during early stages of growth.

15. The method of claim 14, wherein the slurry is prepared by blending together a mineral formulation an amine component, from about 0.1 to 5.0 weight percent seed component and water, the mineral formulation comprising from about 15 to 25 weight percent lime, from about 45 to 75 weight percent pozzolanic component, from about 4 to 12 weight percent sulfate component, and from about 1 to 2 weight percent cellulosic component, from about 0.25 to 0.75 weight percent glue component, all weight percents being based on the total dry weight of the mineral formulation.

16. The method of claim 15, wherein the ratio of dry formulation to water in the slurry is about 1:2 to about 1:4 by weight.

17. The method of claim 15, wherein the amine component of the slurry is an amine selected from the group consisting of:

triethanolamine, diethanolamine, ethanolamine or mixtures thereof.

* * * * *